United States Patent [19]
Sykes

[11] Patent Number: 6,158,160
[45] Date of Patent: Dec. 12, 2000

[54] ICE FREE FISHING LINE SIGNAL DEVICE

[76] Inventor: Willard D. Sykes, 1850 Fairway Bend, Bullhead City, Ariz. 86426

[21] Appl. No.: 08/978,173

[22] Filed: Nov. 25, 1997

[51] Int. Cl.[7] .......................... A01K 97/01; A01K 97/12
[52] U.S. Cl. .................................... 43/4.5; 43/17
[58] Field of Search ............... 43/4, 16, 17, 17.1, 43/4.5

[56] References Cited

U.S. PATENT DOCUMENTS

| | | | |
|---|---|---|---|
| 3,387,401 | 6/1968 | Stelmach | 43/17 |
| 4,945,668 | 8/1990 | Keller | 43/17 |
| 5,598,656 | 2/1997 | Strasser | 43/17 |

*Primary Examiner*—Robert P. Swiatek
*Attorney, Agent, or Firm*—Angenhem Law Firm, Ltd.; N. Paul Friedericks, III

[57] ABSTRACT

An ice fishing device, including: a base, the base defining an aperture; a reel connected to the base; a pulley disposal to the reel and connected to the base; an ice removal coil disposed distal to the reel, fishing line connected to the reel and disposed about the pulley; mechanism for indicating a fish, the indicating mechanism connected to the base and in operable communication with the pulley; mechanism for heating, the heating mechanism being sized to be snugly received within the aperture, being contained in the aperture, being supported by the base, being electrically powered, being selectively removable, and being a bobber; and mechanism for regulating the heat.

18 Claims, 3 Drawing Sheets

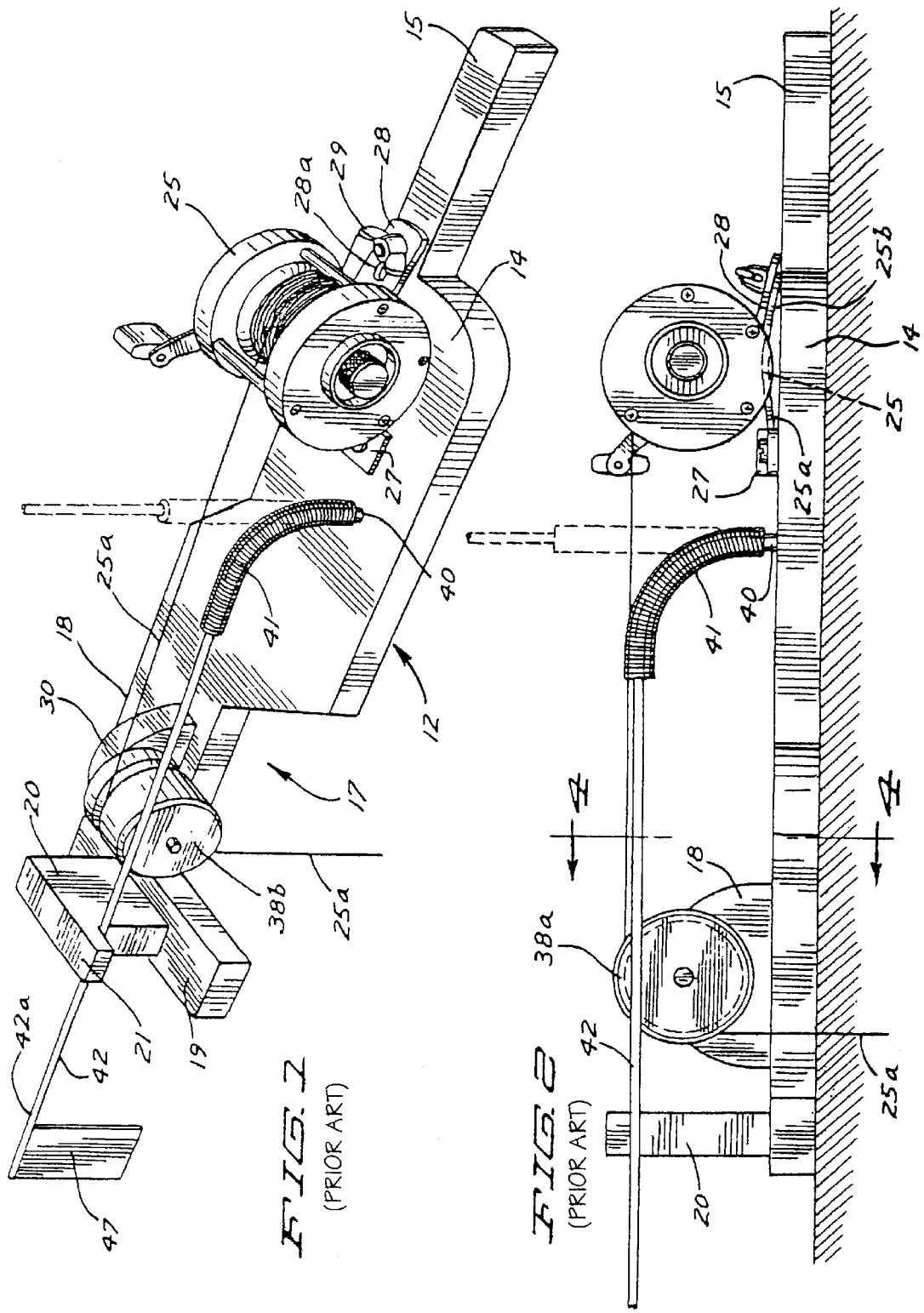

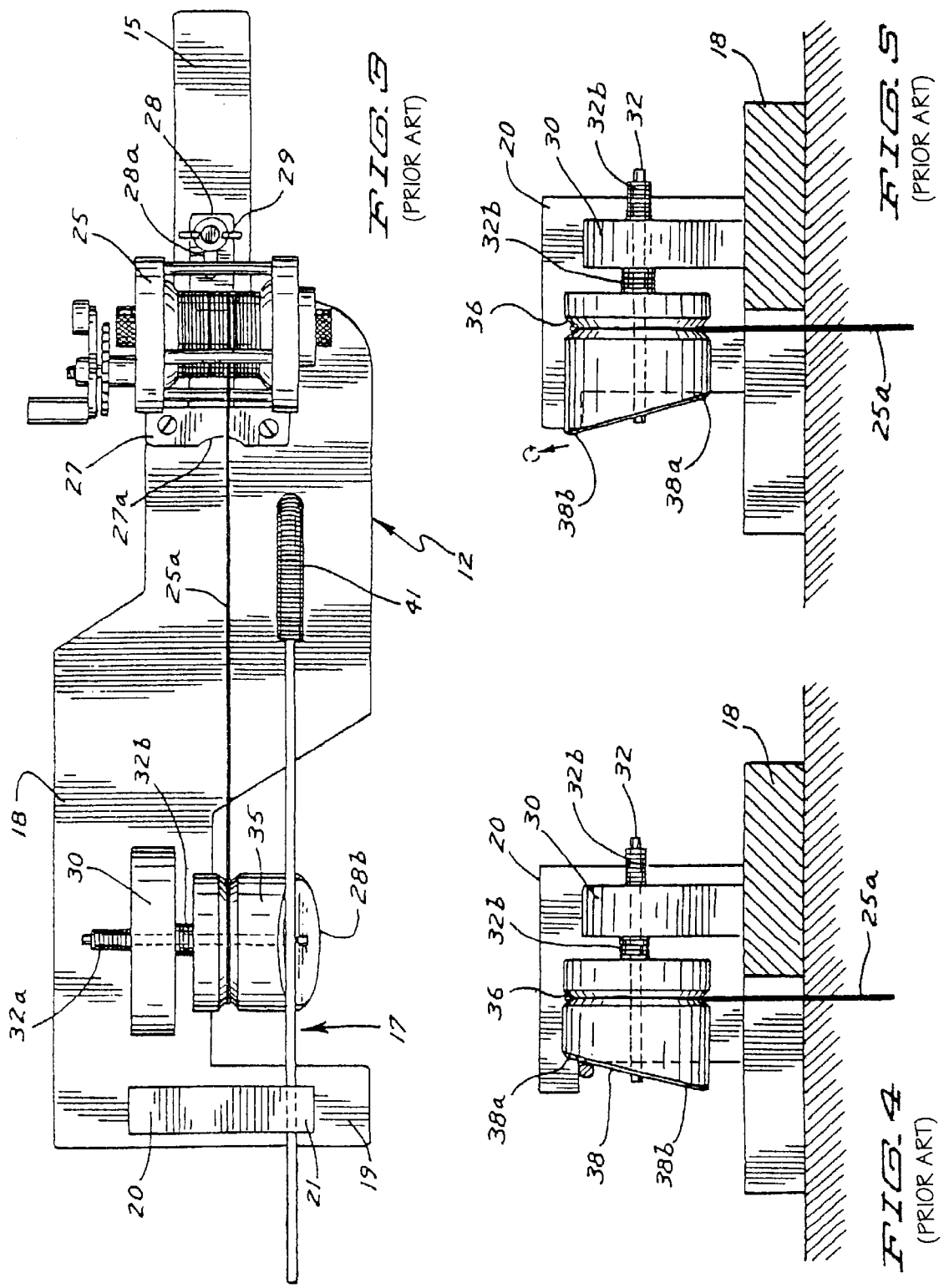

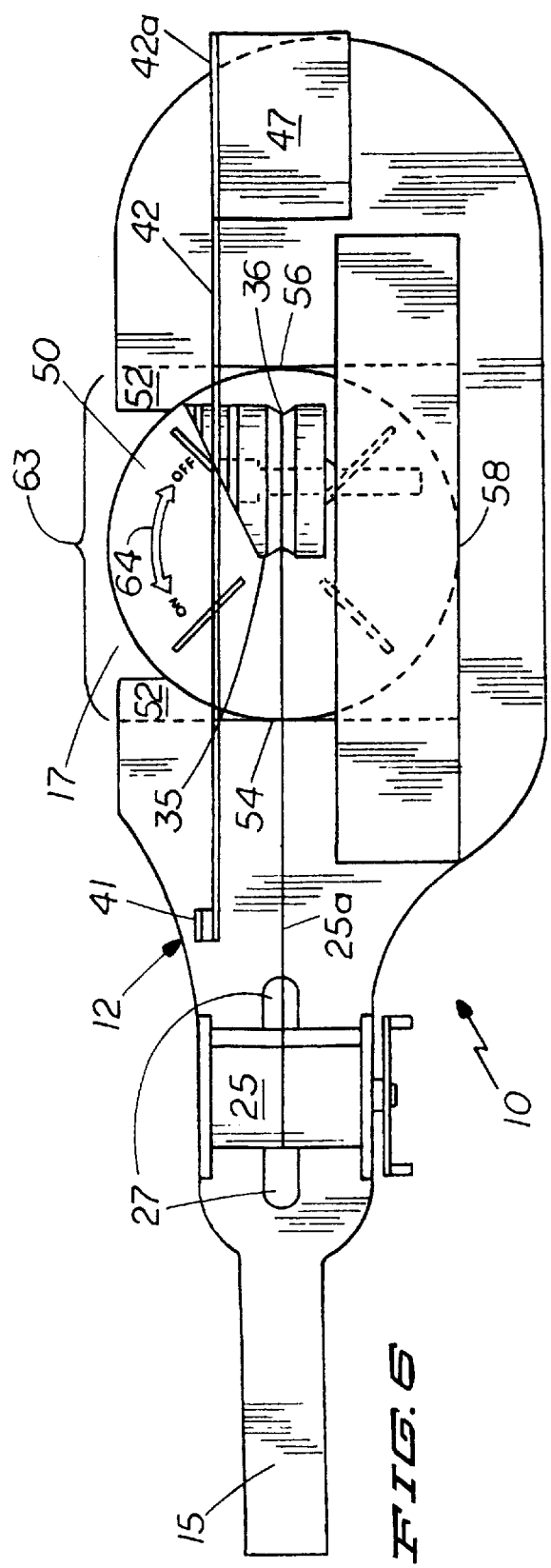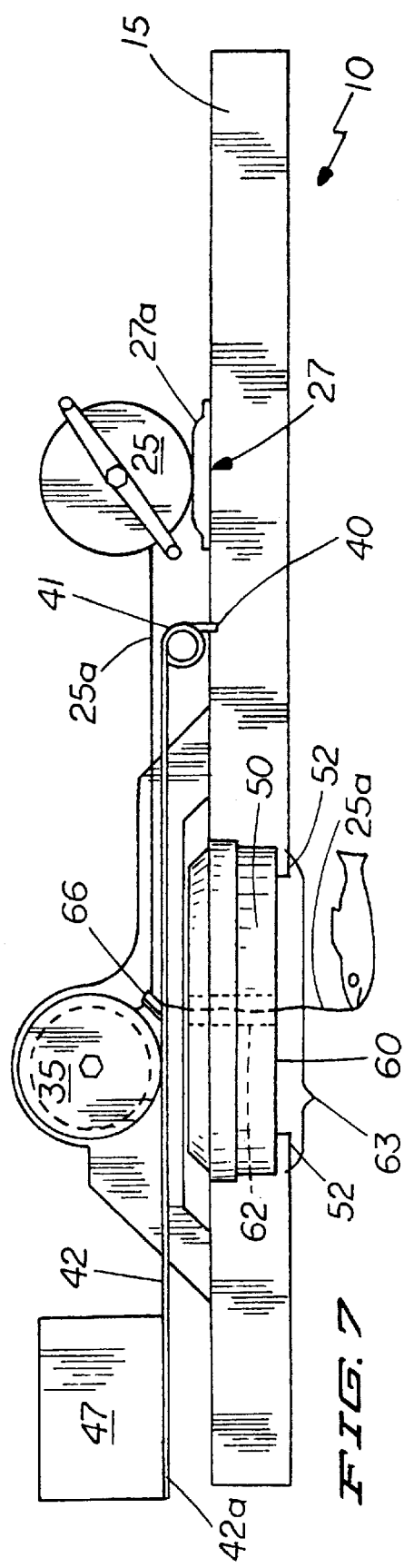

ICE FREE FISHING LINE SIGNAL DEVICE

BACKGROUND OF THE INVENTION

This invention relates to devices for ice fishing and more particularly to ice fishing poles that prevent ice build-up on the fishing line and in the fishing hole.

Anglers have so enjoyed their sport that they have developed methods of resolving adverse weather problems. Winter angling in the north has problems related to the cold. Anglers developed ice fishing poles called tip-ups so that the angler can watch the pole for activity from a distance (preferably from inside a warm shelter). The tip-up includes a base portion sized larger than the hole, a reel, fishing line and a flag or indicator. When the fish strikes, the flag tips upwardly and signals the fisherman. The reel allows for the free release of line until the angler sets the hook and starts retrieving the line. The tip-up is a popular fishing device, but use of tip-ups has draw backs.

Tip-ups developed problems relating to the cold. Particularly, ice builds up on the line and in the reel. The ice prevents the smooth release or retrieval of line, which can result in lost opportunities to catch fish. To solve this problem the reel was positioned below the water surface where any ice build-up would not likely occur and any that would occur when the reel was out of the water, would thaw. An underwater reel required the angler to stick a hand into the frigid water prior to setting the hook. This results in cold and wet hands of the angler.

What is needed is a tip-up with a reel disposed above the water with method for keeping the hole and line free of ice.

SUMMARY OF THE INVENTION

The present invention is an ice fishing device, including a base that defines an aperture, a reel connected to the base, fishing line connected to the reel, mechanism for indicating a fish which is connected to the base and in communication with the reel, and mechanism for heating that is contained in the aperture and supported by the base. The indicating mechanism preferably includes a flag. The device is preferably less dense than water such that it floats if it inadvertently falls into the hole. Suitable materials for construction of the device include wood and plastic.

The device may further include a pulley and an ice removal coil both positioned distal to the reel. The fishing line connected to the reel, passes about the pulley and through the ice removal coil before entering the water. The pulley preferably includes a tapered surface that acts on the mechanism for indicating a fish.

The heating mechanism preferably defines a channel through which the fishing line passes distal to the reel. The heating mechanism is electrically powered. Such electrical power may be from a storage site such as a battery. The heating mechanism may be selectively removable and also function as a bobber. The heating device may be supported above the surface of water, but within a distance sufficiently close for the heating device to keep the hole clear of ice. The heat may be regulated.

The present invention further includes a method of ice fishing. A hole is carved in an ice covered body of water, such as a lake or river. A tip-up with bait is arranged with the bait passing through the hole and lowered into the water. The tip-up is positioned such that a heater portion of the tip-up, preferably electronic, is turned on and positioned to keep the hole thawed. The heater may be powered with stored electrical power such as a battery. The temperature of the tip-up is regulated. The tip-up is monitored for fish activity. The heater portion of the tip-up may be removed from the tip-up and used as a bobber. The fishing line may be reeled in through an ice removal coil, freeing the line of any remaining ice prior to entry into a reel portion of the tip-up.

BRIEF DESCRIPTION OF THE DRAWINGS

FIG. 1 is a view in perspective of prior art;

FIG. 2 is a view in side elevation of prior art;

FIG. 3 is a top plan view of prior art;

FIG. 4 is a view in vertical section of prior art taken on line 4—4 of FIG. 2 as indicated;

FIG. 5 is a view of prior art similar to FIG. 4 in an alternate operating position.

FIG. 6 is a top plan view of the present invention; and

FIG. 7 is a side view of the present invention.

DESCRIPTION OF A PREFERRED EMBODIMENT

Referring to the drawings, the device herein is indicated generally by the reference numeral 10. With particular attention to FIGS. 1 and 3, said device comprises a base plate 12 which may be formed of any suitable fairly light weight rigid material such as wood or plastic. Said base is an elongated plate member having a rear end portion 14 having a handle 15 projecting rearwardly thereof and having an angled offset portion 16 extending forwardly thereof having a cut out portion 17 therein and forming an end portion 19 having an angled keeper 20 upstanding therefrom, said keeper here being shown having a forwardly projecting ledge 21 extending transversely of said base member and forming a retaining member.

Said cut out portion 17 forms a fairly narrow neck portion 18.

Removably mounted on said base member just forward of said handle 15 is a conventional type of reel 25 retained by a bracket 27 here shown formed as a transverse strap having an upwardly upset central portion 27a receiving the forward portion 25a of the mounting plate 25 of said reel and a slotted rear retaining plate 28 overlies the rear extension 25b of said mounting plate and is secured by a thumb screw 29. The slot indicated by 28a permits the plate 28 upon being loosened to be withdrawn sufficiently for the removal of the reel 25.

Upstandingly upon said neck portion 18 is a support block 30 having a shaft 32 journaled therein extending transversely thereof to have a pulley 35 mounted thereon, said pulley being substantially in alignment with said reel. Said pulley projects over said cut out portion 17. Said pulley has a v-groove 36 thereabout. The outer end face 38 of said pulley is slanted or cammed to provide an outer surface which is angled such as at 30°. Said shaft is secured by a coiled spring retainer 32a and is spaced from said block 30 by a spacer 32b.

Mounted upon said base plate 12 forward of said reel 25 is a post 40 and upstanding therefrom connected thereto by a coiled spring sleeve 41 is a spring rod 42 having a flag 47 mounted onto its upper end 42a.

With reference to FIGS. 4 and 5, the face 38 of said pulley 35 has a receding portion of its face 38a and a projecting portion thereof 38b.

The reel 25 is equipped with a fishing line 25a.

In operating position, the fishing line is readied to drop into a body of water for fishing purposes and preparatory to so doing, the line at an appropriate distance from its baited end is wound once or twice around the groove 36 of pulley 35. Then the baited end is dropped into the body of water. Next the rod 42 is bent forwardly at its spring sleeve 41 and is retained under the keeper 20. In this position of the rod 42, the face 38 of said pulley 35 is rotated to have its receding portion 38a uppermost. The face 38 of said pulley is so angled that there is a clear access line for said rod to be engaged under said keeper 20. However, the angle of said face of said pulley is such that upon rotation of said pulley, the face portion 38b in moving upwardly will nudge or displace said rod sufficiently to move it outwardly from under the keeper 20, to release it to spring upwardly with the flag at the upper end thereof alerting the fisherman that there is a fish biting on his line.

The cut out portion 17 as shown in FIGS. 6 and 7 preferably is sized to snugly receive a heating device 50, but may be sized in virtually any shape suitable for supporting the heating device 50. The heating device 50 is bottom supported on a shelf 52 and may be retained by a plurality of sides 54, 56, and 58 which cooperatively define the cut out portion 17. The side may form a portion of a rectangle as shown, form a shape similar to the heating device 50 or may form virtually any other geometric shape. The shelf 52 as shown in FIG. 7 may be relatively thin. The shelf needs to be strong enough to support the weight of the heating device 50, while still holding the heating device 50 close enough to the water when the invention 10 is laid across the surface of the ice. Preferably, the heating device 50 is held within approximately 1 inch of the water surface. Such distance, however is determined in part by the heat output of the heat device 50. The shelf 52 should also be sized to expose a substantial amount of the lower surface 60 of the heat device 50, while snugly receiving the heat device 50 in a gap 63 in the cut out portion 17 (as shown in FIGS. 1 and 3). A lateral width of between ¼ and ½ inch is preferred.

The heating device 50 is preferably similar, accept as provided herein, to the bobber disclosed in U.S. Pat. No. 5,540,009, which is incorporated herein by reference, and is also issued to the present inventor. The heating device 50 of the present invention, however, has a lower surface 60 which is designed and constructed to release heat as it is designed to prevent ice from forming in an ice fishing hole with or without being disposed in the water. The fishing line 25a may drop through a center channel 62 in the heating device 50 such that the line 25a is free to move through the channel 62 in either direction. The channel 62 may be constructed to release heat preventing ice build-up on the line 25a, although such is substantially unnecessary as the line 25a is exposed to the heat from the lower surface 60 of the heat device 50. The heating device 50 may be built into the fishing device 10 and fixedly secured thereto in an alternate embodiment.

A gap 63 in the cut out portion 17 (identified in FIGS. 1 and 3) may be sized for horizontal release of the heating device 50 from the fishing device 10. Alternatively, the heating device 50 may be selectively removable in a vertical fashion with a gap 63 sized to allow horizontal movement of the line 25a therethrough. The heating device 50 may then be allowed to rest in the water and be used as a bobber as described in the U.S. Pat. No. 5,540,009. The heating device 50 may include an on/off switch 64.

The width of the device 10 is preferably sized to cover of nearly cover a fishing hole when the device 10 is laid across the ice. Such a width allows the device 10 to block wind from blowing across the open water, which leads to early freeze-up of the hole. Typically the holes carved in the ice are six (6) inches to eight (8) inches in diameter.

The invention 10 preferably also includes a coil 66 fixedly mounted relative to the base plate 12. The coil 66 snugly, but not tightly receives the line 25a between the spirals. The coil 66 is preferably mounted such that the line 25a must bend to reach the pulley 35. The purpose of the coil 66 is to remove any ice that collects on the line 25a.

All parts of the present invention may be made from wood or polymer. The preferred polymer is polypropylene. The line 25a may also be made of the same polymer. Such polymer has a beneficial characteristic in that ice may form about the plastic, but cannot attach to it. The base plate 12 may be made of a structural foam.

It will of course be understood that various changes may be made in the form, details, arrangement and proportions of the product without departing from the spirit and scope of the invention.

I claim:

1. An ice fishing device, comprising:

a base, the base defining an aperture;

a reel connected to the base;

a pulley disposed distal to the reel and connected to the base;

fishing line connected to the reel and disposed about the pulley;

means for indicating a fish, the indicating means connected to the base and in operable communication with the pulley;

means for removing ice disposed distal to the reel, the removing means being a coil, means for heating, the heating means being sized to be snugly received within the aperture, being contained in the aperture, being supported by the base, being electrically powered, being selectively removable, and being a bobber; and means for regulating the heat.

2. An ice fishing device, comprising:

a base, the base defining an aperture;

a reel connected to the base;

fishing line connected to the reel;

means for indicating a fish, the indicating means connected to the base and in communication with the reel; and means for heating, the heating means is contained in the aperture and supported by the base; wherein the heating means defines a channel and the fishing line passes from the reel and through the channel.

3. The device of claim 2 further comprising:

a coil connected to the base and operably connected to the fishing line.

4. The device of claim 2 wherein the heating means is electrically powered.

5. The device of claim 2 wherein the heating means is a bobber.

6. The device of claim 2 wherein the device has a density lighter than water.

7. The device of claim 2 wherein the base is formed of polymer.

8. The device of claim 2 wherein the base is formed of wood.

9. The device of claim 2 wherein the heating means is selectively removable from the base.

10. The device of claim 2 wherein the heating means is supported above the surface of water.

11. The device of claim 2 further comprising:

a pulley, the fishing line passing from the reel and about the pulley.

12. The device of claim 11 wherein the pulley comprises a tapered surface, the tapered surface operably communicating with the indicating means.

13. The device of claim 2 wherein the heating means further comprises:

means for regulating temperature.

14. A method of fishing comprising:

carving a hole in an ice covered body of water;

setting up a tip-up with bait;

arranging the tip-up about the hole;

turning on a heater portion of the tip-up to keep the hole thawed;

removing the heater portion from the tip-up; and using the heater portion as a bobber.

15. The method of claim 14 further comprising the step of regulating the temperature.

16. The method of claim 14 further comprising the step of:

monitoring the tip-up for fish activity.

17. The method of claim 14 wherein the step of turning on the heater portion further comprises the step of turning on an electronic heater portion of the tip-up.

18. The method of claim 17 further comprising the step of:

using stored electrical power.

* * * * *